United States Patent
Wang et al.

(10) Patent No.: US 11,822,742 B2
(45) Date of Patent: Nov. 21, 2023

(54) TOUCH DISPLAY DEVICE

(71) Applicants: Chengdu BOE Optoelectronics Technology Co., Ltd., Sichuan (CN); BOE Technology Group Co., Ltd., Beijing (CN)

(72) Inventors: Chao Wang, Beijing (CN); Pan Zhao, Beijing (CN); Zhiliang Jiang, Beijing (CN); Dianjie Hou, Beijing (CN); Zhenhua Zhang, Beijing (CN); Chang Liu, Beijing (CN); Zhihong Cui, Beijing (CN); Na Zhang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/788,138

(22) PCT Filed: Sep. 14, 2021

(86) PCT No.: PCT/CN2021/118243
§ 371 (c)(1),
(2) Date: Jun. 22, 2022

(87) PCT Pub. No.: WO2022/083359
PCT Pub. Date: Apr. 28, 2022

(65) Prior Publication Data
US 2023/0021940 A1    Jan. 26, 2023

(30) Foreign Application Priority Data
Oct. 21, 2020 (CN) .......................... 202011130901.4

(51) Int. Cl.
*G06F 3/041* (2006.01)

(52) U.S. Cl.
CPC ............... *G06F 3/04164* (2019.05); *G06F 2203/04102* (2013.01)

(58) Field of Classification Search
CPC ............... G06F 3/04164; G06F 2203/04102
(Continued)

(56) References Cited

U.S. PATENT DOCUMENTS

| 2011/0169759 A1* | 7/2011 | Wang | G06F 3/041 345/173 |
| 2012/0105344 A1* | 5/2012 | Ko | G06F 3/0446 345/173 |

(Continued)

FOREIGN PATENT DOCUMENTS

| CN | 204242150 U | 4/2015 | |
| CN | 105630244 A * | 6/2016 | ........... G06F 3/0412 |

(Continued)

OTHER PUBLICATIONS

PCT/CN2021/118243 international search report and written opinion.

*Primary Examiner* — Mark Edwards
(74) *Attorney, Agent, or Firm* — IPro, PLLC

(57) ABSTRACT

The present disclosure provides a touch display device which includes a display panel and a flexible circuit board coupled to the display panel. The flexible circuit board includes a display functional region and a touch functional region, the display functional region is coupled to a control mainboard of the touch display device via a first connector, and the touch functional region is coupled to the control mainboard of the touch display device via a second connector.

6 Claims, 2 Drawing Sheets

(58) Field of Classification Search
USPC .......................................................... 345/173
See application file for complete search history.

(56) References Cited

U.S. PATENT DOCUMENTS

| | | | |
|---|---|---|---|
| 2016/0357311 A1 | 12/2016 | Wang et al. | |
| 2018/0217696 A1* | 8/2018 | Binstead | ............... G06F 3/0446 |
| 2019/0101988 A1* | 4/2019 | Kang | .................. G06F 3/03547 |
| 2020/0113042 A1* | 4/2020 | Park | ..................... H01R 12/725 |
| 2020/0363882 A1* | 11/2020 | Nam | ....................... H05K 3/361 |

FOREIGN PATENT DOCUMENTS

| | | | |
|---|---|---|---|
| CN | 105630244 A | 6/2016 |
| CN | 105739141 A | 7/2016 |
| CN | 108563356 A | 9/2018 |
| CN | 110910766 A | 3/2020 |
| CN | 112148153 A | 12/2020 |

\* cited by examiner

TOUCH DISPLAY DEVICE

CROSS-REFERENCE TO RELATED APPLICATIONS

This application is the U.S. national phase of PCT Application No. PCT/CN2021/118243 filed on Sep. 14, 2021, which claims a priority of the Chinese Patent Application No. 202011130901.4 filed on Oct. 21, 2020, which is incorporated herein by reference in its entirety.

TECHNICAL FIELD

The present disclosure relates to the manufacture of a display product, in particular to a touch display device.

BACKGROUND

Currently, a conventional 6-to-7-inch, 21:9 mobile phone display panel has been expanded to a 7-to-9-inch, 10:9 panel (foldable panel). For a medium-size display panel, there exists the following problem for the design of a Flexible Printed Circuit (FPC) due to an increase in the size. In order to reduce touch loading caused by the large-size display panel, a 2T1R design is adopted (i.e., touch electrode signal lines Tx are arranged at opposite sides of a display region, but a sensing electrode signal line Rx is merely arranged at one side of the display region). Due to the arrangement of two driving electrode signal lines and one sensing electrode signal line, the quantity of signal lines increases, and thereby it is difficult to design a wiring mode of the FPC. At this time, it is necessary to increase a size of the FPC. However, in order to meet the customer's requirement, the size of the FPC needs to be reduced so as to increase a space for a battery.

SUMMARY

An object of the present disclosure is to provide a touch display device, so as to prevent a space for a battery from being occupied by an FPC of a large-size display panel.

The present disclosure provides in some embodiments a touch display device, including a display panel and a flexible circuit board coupled to the display panel. The flexible circuit board includes a display functional region and a touch functional region, the display functional region is coupled to a control mainboard of the touch display device via a first connector, and the touch functional region is coupled to the control mainboard of the touch display device via a second connector.

In a possible embodiment of the present disclosure, the flexible circuit board includes a main body portion and a first connection portion and a second connection portion arranged at two opposite sides of the main body portion in a lengthwise direction, the first connector is arranged at an end of the first connection portion, the second connector is arranged at an end of the second connection portion, and the lengthwise direction of the main body portion is parallel to a binding portion between the display panel and the flexible circuit board.

In a possible embodiment of the present disclosure, the flexible circuit board is provided with two display element regions and a touch element region including a touch Integrated Circuit (IC), the touch element region is arranged on the second connection portion, and at least one of the two display element regions is arranged on the main body portion.

In a possible embodiment of the present disclosure, the flexible circuit board has a U-shaped structure, the main body portion is coupled to the display panel at a first side, and the first connection portion and the second connection portion are both arranged at a second side of the main body portion opposite to the first side.

In a possible embodiment of the present disclosure, the display panel includes a central display region and a wiring region surrounding the central display region, the wiring region includes a first region at a first side of the central display region in a first direction, and a second region and a third region adjacent to the first region, the second region is arranged opposite to the third region, the second region is provided with a sensing electrode signal line extracted from the central display region and coupled to the touch element region, and each of the second region and the third region is provided with a driving electrode signal line extracted from the central display region and coupled to the touch element region.

In a possible embodiment of the present disclosure, a first touch binding region and a second touch binding region are arranged at both sides of a binding region of the display panel coupled to the main body portion respectively, the driving electrode signal line includes a first driving electrode signal line arranged at the second region and a second driving electrode signal line arranged at the third region, the first driving electrode signal line is coupled to the flexible circuit board via the first touch binding region and coupled to the touch IC via a first line on the flexible circuit board, the second driving electrode signal line and the sensing electrode signal line are coupled to the flexible circuit board via the second touch binding region, the first line extends along an extension direction of the main body portion.

In a possible embodiment of the present disclosure, a third touch binding region is arranged at one side of the binding region of the display panel coupled to the main body portion, the driving electrode signal line includes a first driving electrode signal line arranged at the second region and a second driving electrode signal line arranged at the third region, the first driving electrode signal line passes through the first region and is coupled to the flexible circuit board via the third touch binding region, and the second driving electrode signal line is coupled to the flexible circuit board via the third touch binding region.

In a possible embodiment of the present disclosure, the first connector has 60 pins, and the second connector has 10 pins.

In a possible embodiment of the present disclosure, the touch display device further includes a chip on film arranged between the display panel and the flexible circuit board, and a display IC is arranged on the chip on film.

In a possible embodiment of the present disclosure, the display panel is provided with a display IC.

The present disclosure has the following beneficial effects. Through the first connector and the second connector, it is able to achieve a display function and a touch function separately and easily, thereby to facilitate a pattern generation test as well as automatic production.

DETAILED DESCRIPTION

Figure 1:
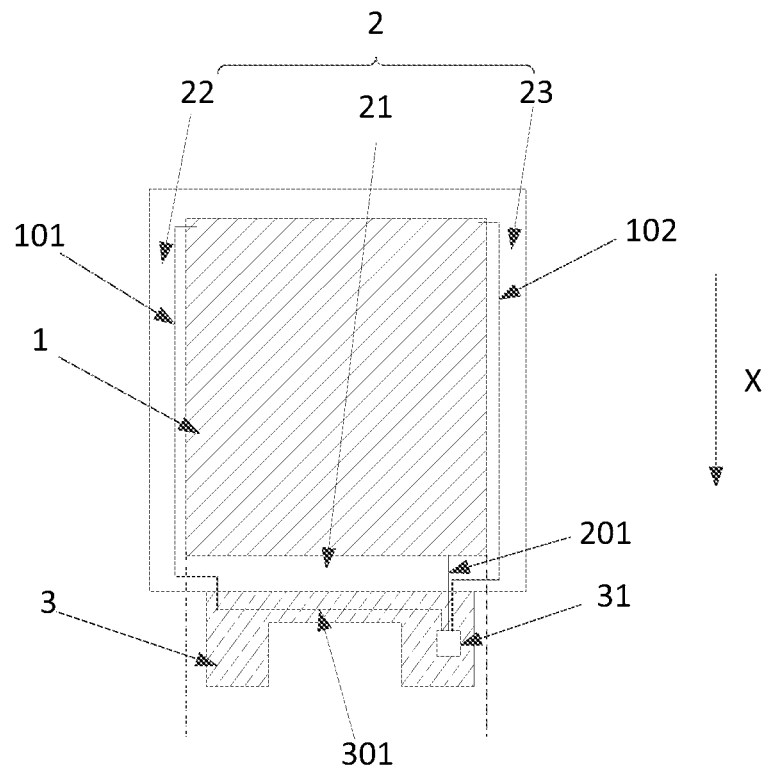
FIG. 1 is a schematic view showing a touch display device according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, it should be appreciated that, such words as "in the middle of", "on/above", "under/below", "left", "right", "vertical", "horizontal", "inside" and "outside" may be used to indicate directions or positions as viewed in the drawings, and they are merely used to facilitate the description in the present disclosure, rather than to indicate or imply that a device or member must be arranged or operated at a specific position. In addition, such words as "first", "second" and "third" may be merely used to differentiate different components rather than to indicate or imply any importance.

Due to an increase in the quantity of signal lines for a large-size display panel, two ICs need to be provided, resulting in an increase in the quantity of pins of an FPC connector. However, it is impossible for a single connector to meet the requirement on the quantity of pins, because a single connector at most has 60 pins while the quantity of pins for a double-IC design is greater than 60 pins. In addition, in each pattern generation test, two connectors need to be provided, so it is difficult to perform the production and the internal verification.

In order to solve the above-mentioned problems, the present disclosure provides in some embodiments a touch display device, which includes a display panel and a flexible circuit board 3 coupled to the display panel. The flexible circuit board includes a display functional region and a touch functional region, the display functional region is coupled to a control mainboard of the touch display device via a first connector 4, and the touch functional region is coupled to the control mainboard of the touch display device via a second connector 5.

Figure 2:
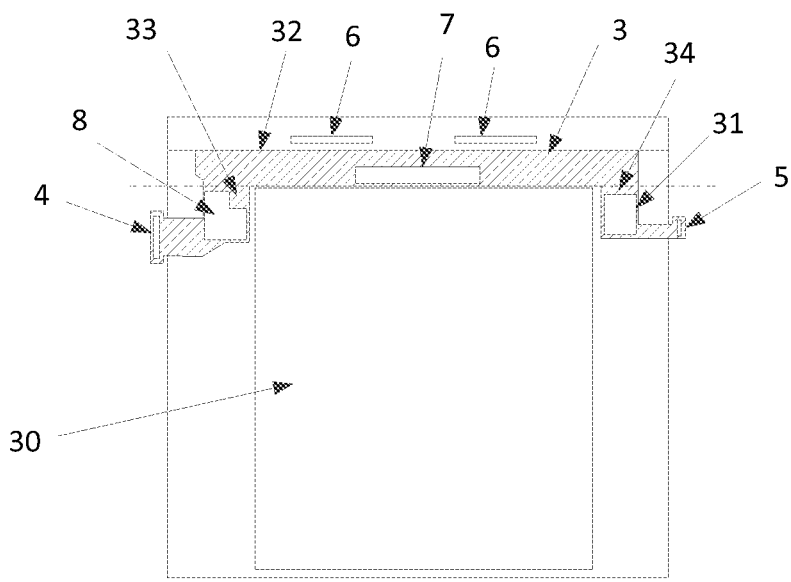
FIG. 2 is another schematic view showing the touch display device according to one embodiment of the present disclosure.

FIG. 1 is a front view of the touch display device when the flexible circuit board 3 is not folded, and FIG. 2 is a back view of the touch display device when the flexible circuit board 3 is folded.

In the embodiments of the present disclosure, the display functional region is coupled to the control mainboard of the touch display device via the first connector 4, and the touch functional region is coupled to the control mainboard of the touch display device via the second connector 5. When merely the image quality and display-related parameters need to be taken into consideration, the display panel is coupled to the first connector 4, and when merely a touch function needs to be achieved, the display panel is coupled to the second connector 5. In other words, the touch function and the display function are controlled separately and easily, so it is able to facilitate a pattern generation test as well as automatic production.

Illustratively, the flexible circuit board 3 includes a main body portion 32 and a first connection portion 33 and a second connection portion 34 arranged at two opposite sides of the main body portion 32 in a lengthwise direction, the first connector 4 is arranged at an end of the first connection portion 33, the second connector 5 is arranged at an end of the second connection portion 34, and the lengthwise direction of the main body portion is parallel to a binding portion between the display panel and the flexible circuit board (i.e., a direction perpendicular to direction X in FIG. 1).

The first connector 4 and the second connector 5 protrude from the flexible circuit board 3. With reference to FIG. 2, the first connector 4 and the second connector 5 are both arranged outside the flexible circuit board 3. The first connector 4 is arranged on the first connection portion 33, and protrudes from the first connection portion 33 in a direction away from the second connection portion 34, i.e., the first connector 4 is exposed on the first connection portion 33. Similarly, the second connector 5 is arranged on the second connection portion 34, and protrudes from the second connection portion 34 in a direction away from the first connection portion 33, i.e., the second connector 5 is exposed on the second connection portion 34. Hence, it is able to perform the connection directly, without any need to provide an additional flexible circuit board.

Illustratively, the flexible circuit board 3 is provided with two display element regions (a first display element region 7 and a second display element region 8) and a touch element region 31 including a touch IC, the touch element region 31 is arranged on the second connection portion, and at least one of the two display element regions is arranged on the main body portion 32.

Display elements and touch elements are arranged on the first connection portion 33 and the second connection portion 34, rather than on the main body portion 32, so it is able to reduce the quantity of elements on the main body portion 32, and reduce an area occupied by the main body portion 32, especially a width of the flexible circuit board 3 in the first direction (i.e., the direction X in FIG. 1), thereby to reduce a width of the touch display device in the first direction.

In the embodiments of the present disclosure, the touch IC is configured to obtain a touch position, and transmit it to a Central Processing Unit (CPU) in the control mainboard of the touch display device via the second connector 5, so that the corresponding touch function is achieved through the CPU.

Illustratively, the flexible circuit board 3 has a U-shaped structure, the main body portion 32 is coupled to the display panel at a first side, and the first connection portion 33 and the second connection portion 34 are both arranged at a second side of the main body portion 32 opposite to the first side.

Illustratively, the display panel includes a central display region 1 and a wiring region 2 surrounding the central display region, the wiring region 2 includes a first region 21 at a first side of the central display region 1 in a first direction, and a second region 22 and a third region 23 adjacent to the first region 21, the second region 22 is arranged opposite to the third region 23, the second region 22 is provided with a sensing electrode signal line 201 extracted from the central display region 1 and coupled to the touch element region 31, and each of the second region 22 and the third region 23 is provided with a driving electrode signal line extracted from the central display region 1 and coupled to the touch element region 31.

As shown in FIG. 1, the central display region 1 is provided with a driving electrode and a sensing electrode for achieving the touch function. The second region 22 is provided with a driving electrode signal line Tx (a first driving electrode signal line 101) coupled to the driving electrode and a sensing electrode signal line Rx 201 coupled to the sensing electrode, and both the driving electrode signal line Tx and the sensing electrode signal line Rx extend along the first direction (the direction X in FIG. 1, i.e., a direction from the central display region 1 to the first region 21). The third region 23 is provided with a driving electrode signal line Tx (a second driving electrode signal line 102) extending in the first direction. When the touch IC is arranged on the second connection portion 34, the driving electrode signal line Tx and the sensing electrode signal line Rx at the third region 23 are directly extracted to the touch IC without being bent, so it is unnecessary to occupy a space for the flexible circuit board 3, i.e., it is able to increase a width of the flexible circuit board 3. As compared with an arrangement mode where the touch IC is arranged on the main body portion 32, it is able to reduce the width of the flexible circuit board 3 in the first direction, reduce the manufacture cost, and increase a space 30 for receiving a battery (the space 30 in the middle in FIG. 2).

Illustratively, referring to FIG. 1, a third touch binding region is arranged at one side of the binding region of the display panel coupled to the main body portion 32, the driving electrode signal line includes a first driving electrode signal line 101 arranged at the second region 22 and a second driving electrode signal line 102 arranged at the third region 23, the first driving electrode signal line passes through the first region and is coupled to the flexible circuit board 3 via the third touch binding region, and the second driving electrode signal line 102 is coupled to the flexible circuit board 3 via the third touch binding region.

Figure 3:
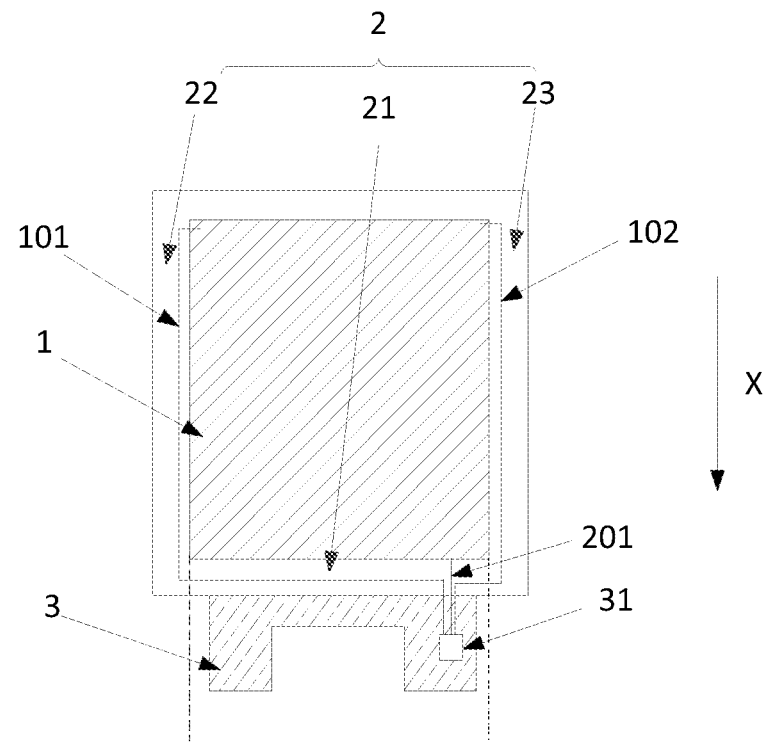
FIG. 3 is yet another schematic view showing the touch display device according to one embodiment of the present disclosure.

Illustratively, referring to FIG. 3, a first touch binding region and a second touch binding region are arranged at both sides of the binding region of the display panel coupled to the main body portion 32 respectively, the driving electrode signal line includes a first driving electrode signal line 101 arranged at the second region 22 and a second driving electrode signal line 102 arranged at the third region 23, the first driving electrode signal line 101 is coupled to the flexible circuit board 3 via the first touch binding region and coupled to the touch IC via a first line 301 on the flexible circuit board 3, the second driving electrode signal line 102 and the sensing electrode signal line 201 are coupled to the flexible circuit board 3 via the second touch binding region, the first line 301 extends along an extension direction of the main body portion 32.

As shown in FIG. 1, the driving electrode signal line includes the first driving electrode signal line 101 arranged at the second region 22 and the second driving electrode signal line 102 arranged at the third region 23, and the second driving electrode signal line 102 and the sensing electrode signal line 201 are coupled to the flexible circuit board 3 via the second touch binding region. The first driving electrode signal line 101 extends to the first region 21 along the first direction, and then is coupled to the flexible circuit board 3 via the first touch binding region and coupled to the touch IC via the first line 301 on the flexible circuit board 3. In this way, the first driving electrode signal line 101 does not occupy any space in the first region 21, so it is able to prevent an increase in a width of the touch display device in the first direction.

Illustratively, the first connector has 60 pins, and the second connector has 10 pins.

Illustratively, the first region 21 of the display panel is provided with a display IC 6, and a signal from the display IC 6 is transmitted to the CPU in the main control board of the touch display device through the flexible circuit board 3.

Figure 4:
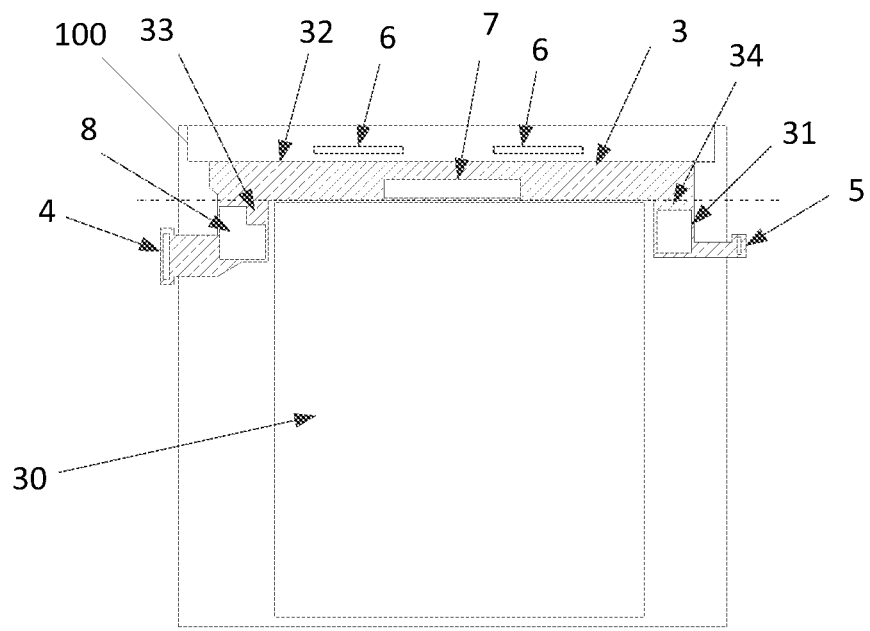
FIG. 4 is still yet another schematic view showing the touch display device according to one embodiment of the present disclosure.

The display panel has a Chip on Panel (COP) structure or a Chip on Film (COF) structure. Illustratively, referring to FIG. 4, a chip on film 100 is further arranged between the display panel and the flexible circuit board 3, the display IC 6 is arranged on the chip on film 100, and the signal from the display IC is transmitted to the CPU in the main control board of the touch display device through the flexible circuit board 3.

The driving electrode signal line and the sensing electrode signal line are coupled to the touch IC on the flexible circuit board via a line on the chip on film.

A method for driving the touch display device includes: enabling the touch display device to be coupled to the first connector to perform a display operation; and enabling the touch display device to be coupled to the second connector to perform a touch operation.

The corresponding operations may be performed without any need to enable the touch display device to be coupled to the first connector and the second connector simultaneously. In other words, when a touch-related operation, e.g., touch detection, is to be performed, it is merely necessary to enable the touch display device to be coupled to the first connector, and when a display-related operation, e.g., image quality detection, is to be performed, it is merely necessary to enable the touch display device to be coupled to the second connector. As a result, it is able to control the touch operation and the display operation separately and easily, thereby to facilitate a pattern generation test as well as automatic production.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch display device, comprising a display panel and a flexible circuit board coupled to the display panel, wherein the flexible circuit board comprises a display functional region and a touch functional region, the display functional region is coupled to a control mainboard of the touch display device via a first connector, and the touch functional region is coupled to the control mainboard of the touch display device via a second connector, wherein the flexible circuit board comprises a main body portion and a first connection portion and a second connection portion arranged at two opposite sides of the main body portion in a lengthwise direction, the first connector is arranged at an end of the first connection portion, the second connector is arranged at an end of the second connection portion, and the lengthwise direction of the main body portion is parallel to a binding portion between the display panel and the flexible circuit board, wherein the flexible circuit board is provided with two display element regions and a touch element region comprising a touch Integrated Circuit (IC), the touch element region is arranged on the second connection portion, and at least one of the two display element regions is arranged on the main body portion, wherein the display panel comprises a central display region and a wiring region surrounding the central display region, the wiring region comprises a first region at a first side of the central display region in a first direction, and a second region and a third region adjacent to the first region, the second region is arranged opposite to the third region, the second region is provided with a sensing electrode signal line extracted from the central display region and coupled to the touch element region, and each of the second region and the third region is provided with a driving electrode signal line extracted from the central display region and coupled to the touch element region, wherein a first touch binding region and a second touch binding region are arranged at both sides of a binding region of the display panel coupled to the main body portion respectively, the driving electrode signal line comprises a first driving electrode signal line arranged at the second region and a second driving electrode signal line arranged at the third region, the first driving electrode signal line is coupled to the flexible circuit board via the first touch binding region and coupled to the touch IC via a first line on the flexible circuit board, the second driving electrode signal line and the sensing electrode signal line are coupled to the flexible circuit board via the second touch binding region, the first line extends along an extension direction of the main body portion.

2. The touch display device according to claim 1, wherein the flexible circuit board has a U-shaped structure, the main body portion is coupled to the display panel at a first side, and the first connection portion and the second connection portion are both arranged at a second side of the main body portion opposite to the first side.

3. A touch display device, comprising a display panel and a flexible circuit board coupled to the display panel, wherein the flexible circuit board comprises a display functional region and a touch functional region, the display functional region is coupled to a control mainboard of the touch display device via a first connector, and the touch functional region is coupled to the control mainboard of the touch display device via a second connector, wherein the flexible circuit board comprises a main body portion and a first connection portion and a second connection portion arranged at two opposite sides of the main body portion in a lengthwise direction, the first connector is arranged at an end of the first connection portion, the second connector is arranged at an end of the second connection portion, and the lengthwise direction of the main body portion is parallel to a binding portion between the display panel and the flexible circuit board, wherein the flexible circuit board is provided with two display element regions and a touch element region comprising a touch Integrated Circuit (IC), the touch element region is arranged on the second connection portion, and at least one of the two display element regions is arranged on the main body portion, wherein the display panel comprises a central display region and a wiring region surrounding the central display region, the wiring region comprises a first region at a first side of the central display region in a first direction, and a second region and a third region adjacent to the first region, the second region is arranged opposite to the third region, the second region is provided with a sensing electrode signal line extracted from the central display region and coupled to the touch element region, and each of the second region and the third region is provided with a driving electrode signal line extracted from the central display region and coupled to the touch element region, wherein a third touch binding region is arranged at one side of the binding region of the display panel coupled to the main body portion, the driving electrode signal line comprises a first driving electrode signal line arranged at the second region and a second driving electrode signal line arranged at the third region, the first driving electrode signal line passes through the first region and is coupled to the flexible circuit board via the third touch binding region, and the second driving electrode signal line is coupled to the flexible circuit board via the third touch binding region.

4. The touch display device according to claim 1, wherein the first connector has 60 pins, and the second connector has 10 pins.

5. The touch display device according to claim 1, further comprising a chip on film arranged between the display panel and the flexible circuit board, and a display IC is arranged on the chip on film.

6. The touch display device according to claim 1, wherein the display panel is provided with a display IC.

* * * * *